United States Patent
Cui

(10) Patent No.: US 12,135,957 B2
(45) Date of Patent: Nov. 5, 2024

(54) DYNAMIC GENERATION OF DEVICE IDENTIFIERS

(71) Applicant: Alibaba Group Holding Limited, George Town (KY)

(72) Inventor: Xiaoxia Cui, Hangzhou (CN)

(73) Assignee: Alibaba Group Holding Limited (KY)

(*) Notice: Subject to any disclaimer, the term of this patent is extended or adjusted under 35 U.S.C. 154(b) by 897 days.

(21) Appl. No.: 17/024,569

(22) Filed: Sep. 17, 2020

(65) Prior Publication Data
US 2021/0096821 A1 Apr. 1, 2021

(30) Foreign Application Priority Data
Sep. 26, 2019 (CN) .................. 201910918969.X

(51) Int. Cl.
| | |
|---|---|
| *G06F 7/58* | (2006.01) |
| *G06F 12/0804* | (2016.01) |
| *G06F 12/0862* | (2016.01) |
| *G06F 21/73* | (2013.01) |
| *H04L 9/08* | (2006.01) |
| *H04L 9/32* | (2006.01) |

(52) U.S. Cl.
CPC .......... *G06F 7/588* (2013.01); *G06F 12/0804* (2013.01); *G06F 12/0862* (2013.01); *G06F 21/73* (2013.01); *H04L 9/0866* (2013.01); *H04L 9/3278* (2013.01)

(58) Field of Classification Search
CPC .. G06F 7/588; G06F 12/0804; G06F 12/0862; G06F 21/73; G06F 5/06; G06F 7/58; H04L 9/0866; H04L 9/3278
See application file for complete search history.

(56) References Cited

U.S. PATENT DOCUMENTS

| | | | |
|---|---|---|---|
| 8,750,502 B2* | 6/2014 | Kirkpatrick | H04L 9/0866 714/E11.042 |
| 2009/0319799 A1 | 12/2009 | Carpenter | |
| 2013/0024686 A1 | 1/2013 | Drucker | |
| 2014/0042442 A1 | 2/2014 | Bruley | |
| 2014/0164771 A1* | 6/2014 | Danree | H04L 63/062 713/170 |
| 2015/0019710 A1 | 1/2015 | Shaashua | |
| 2015/0101037 A1 | 4/2015 | Yang | |
| 2016/0179663 A1 | 6/2016 | Roesch | |

(Continued)

FOREIGN PATENT DOCUMENTS

| | | |
|---|---|---|
| CN | 104657630 | 5/2015 |
| CN | 105721621 | 6/2016 |
| EP | 2874135 | 5/2015 |

OTHER PUBLICATIONS

Anagnostopoulos et al., An Overview of DRAM-Based Security Primitives, Cryptography 2018, Mar. 28, 2018, pp. 1-33.

(Continued)

*Primary Examiner* — Quazi Farooqui
(74) *Attorney, Agent, or Firm* — Van Pelt, Yi & James LLP

(57) ABSTRACT

Dynamic generation of device identifiers is disclosed, including: issuing an identifier configuration request in response to a user operation; after receiving the identifier configuration request, calling a true random number generator source to generate random information; and writing the random information or a data processing result from the random information as the identifier into a predetermined storage area.

26 Claims, 8 Drawing Sheets

(56) References Cited

U.S. PATENT DOCUMENTS

| | | |
|---|---|---|
| 2017/0173262 A1 | 6/2017 | Veltz |
| 2017/0371807 A1* | 12/2017 | Chai ................... G06F 12/0891 |
| 2018/0123808 A1 | 5/2018 | Hung |
| 2018/0205543 A1* | 7/2018 | Fradet ................... H04L 9/3234 |
| 2019/0253417 A1* | 8/2019 | Kim ........................ G06F 21/60 |
| 2019/0289006 A1 | 9/2019 | Fang |
| 2020/0287716 A1* | 9/2020 | Zitlaw ................... H04L 9/0866 |

OTHER PUBLICATIONS

Zihan et al. "Hardware implementation of physical unclonable function on FPGAs." Journal of Computer-Aided Design & Computer Graphics 29.9 (2017): 1590-1603.

* cited by examiner

DYNAMIC GENERATION OF DEVICE IDENTIFIERS

CROSS REFERENCE TO OTHER APPLICATIONS

This application claims priority to People's Republic of China Patent Application No. 201910918969.X entitled CONFIGURATION APPARATUS AND CONFIGURATION METHOD FOR PROVIDING RESETTABLE IDENTIFIERS filed Sep. 26, 2019 which is incorporated herein by reference for all purposes

FIELD OF THE INVENTION

The present invention relates to a field of integrated circuitry. Specifically, the present invention relates to techniques for dynamically generating unique identifiers for electronic apparatuses (e.g., devices).

BACKGROUND OF THE INVENTION

Electronic devices with all kinds of features have brought great convenience to people's everyday lives, but have also introduced potential security threats.

An example may be found in Internet of Things (IoT) technology. To manage electronic devices in the Internet of Things, it is often necessary to individually set a unique identifier for each electronic device for the purpose of identification and to derive a private key, certificate, encryption key, or other password information used in a password security context for the electronic device based on this unique identifier. However, this unique identifier is easily stolen, and thus all kinds of password information throughout the electronic device can be deciphered, resulting in leakage of user information stored on the electronic device.

To improve the security of electronic devices, manufacturers generally use the physical characteristics of specific hardware to generate characteristic information and to configure unique identifiers for chips in order to ensure that electronic devices having different chips will have different unique identifiers. For example, using physical unclonable function (PUF) technology, it is possible to use the naturally varying physical characteristics of wafers in the manufacturing process to generate unique identifiers containing characteristic information.

However, some deficiencies in using the PUF technology to generate unique identifiers for devices are as follows: PUF technology places very high requirements on the manufacturing processes of wafer manufacturers. The processes are complex, and the technology is quite difficult to implement. Implementing PUF is also costly. In many situations, the physical characteristics of specific hardware are affected as time elapses and the environment in which the hardware is used also changes. As a consequence of using PUF to generate identifiers for hardware, the identifiers will change as the physical characteristics and use environment of the hardware changes, which in turn will cause all the various types of password information derived from these unique identifiers to change. Thus, legitimate users who are unaware that the identifiers of their hardware had changed may run into errors and failures during operation and may also face data security risks.

Chip manufacturers are responsible for introducing unique identifiers in the chip manufacturing process. Therefore, chip manufacturers also need to be responsible for solving problems in the use process resulting from changes that occur in unique identifiers over time and in different environments. This creates difficulties for both users and manufacturers. In some instances, after the chip manufacturing process ends, unique identifiers generated on the basis of PUF technology will be locked by the physical characteristics of specific hardware and cannot be reconfigured by the user, which is inconvenient for the user for whom the identifier of the hardware may have been compromised (e.g., obtained by an illegitimate user).

BRIEF DESCRIPTION OF THE DRAWINGS

Various embodiments of the invention are disclosed in the following detailed description and the accompanying drawings.

Reference to the drawings below that describe embodiments of the present invention will further clarify the objectives, features, and advantages, whether described above or otherwise, of the present invention. The drawings.

DETAILED DESCRIPTION

Figure 1:
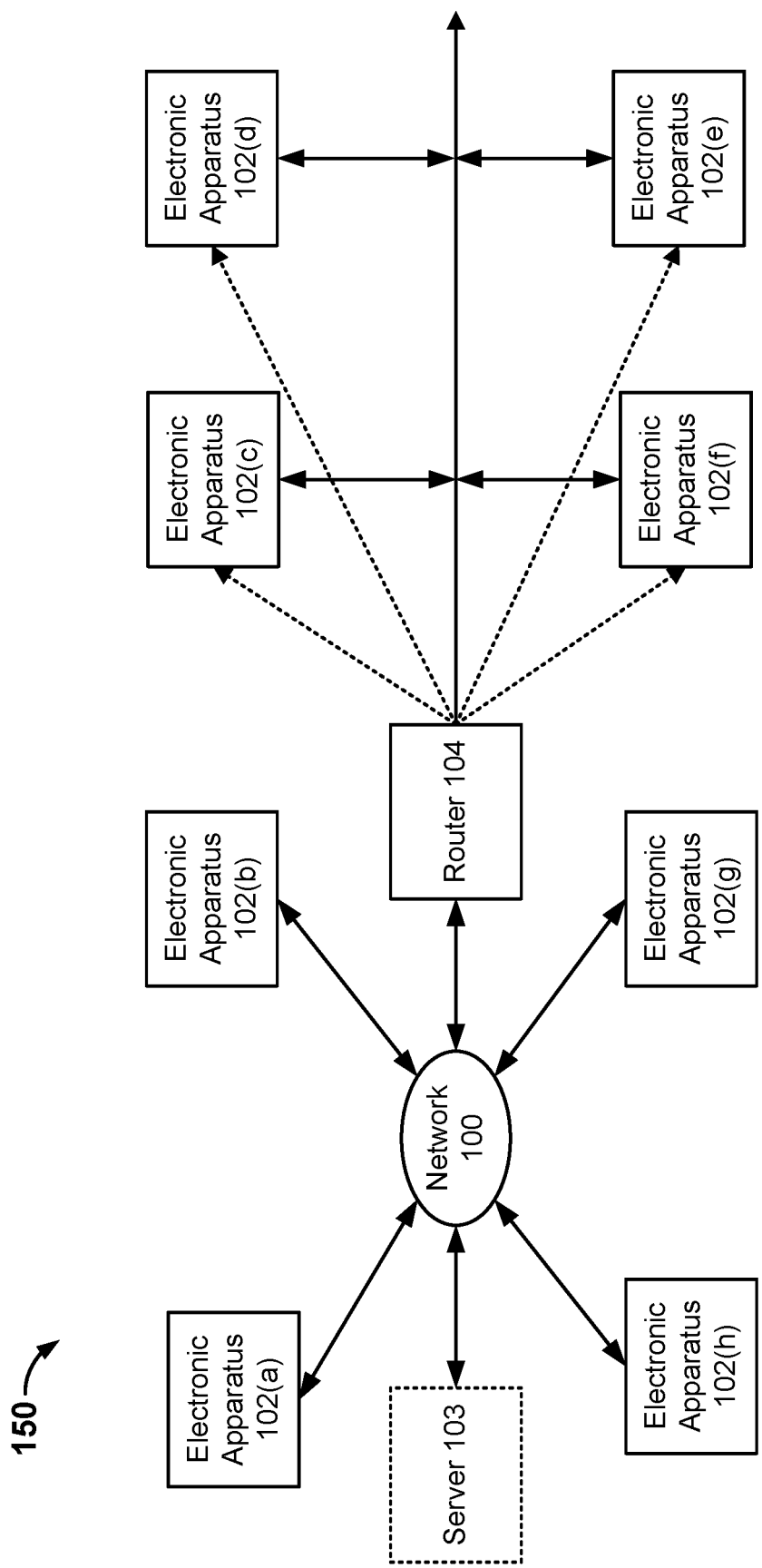
FIG. 1 is a diagram of a system for generating and using unique identifiers for electronic apparatuses in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When a system has multiple electronic apparatuses, each electronic apparatus needs to have a unique identifier so that the system can uniquely identifier each electronic apparatus and collectively manage the many electronic apparatuses. For each electronic apparatus, its unique identifier is provided by a specific chip that is built into the electronic apparatus. An electronic apparatus' corresponding identifier must have the qualities of randomness and uniqueness. In addition, the unique identifier associated with each electronic apparatus may also be used to generate password information, such as keys or certificates, for the electronic apparatus. Therefore, an electronic apparatus' unique identifier needs to be private (e.g., known only to the legitimate users).

A true random number generator (TRNG) is an electronic circuit used to generate a number series that, at least theoretically, cannot be predicted. True random numbers can be generated in response to stimulus and by calling a true random number generator source (e.g., that samples thermal noise source, photoelectric effect, physical noise source in atomic/quantum phenomena, or a hardware circuit capable of generating signals). A true random number generator under appropriate stimulus can repeatedly generate true random numbers. Unlike, physical unclonable function (PUF) technology, true random number generators do not rely on the physical characteristics of wafers in the manufacturing process.

The example application to Internet of Things technology will be used in the description below, but it should be understood that embodiments described herein may be applied to any hardware or hardware-software composite system in which unique and random identifiers need to be generated.

The Internet of Things is a system wherein multiple electronic apparatuses are interconnected to each other and/or to a communication system (e.g., the Internet). Each electronic apparatus in an Internet of Things system can implement functions such as data collection, data exchange, and actuation, for example. In the present document, each electronic apparatus in an Internet of Things system communicates with other electronic apparatuses in the Internet of Things system and also with a communication network. Moreover, each electronic apparatus can autonomously or semi-autonomously execute one or more functions. Electronic apparatuses in the Internet of Things system may include a gateway for linking different electronic apparatuses together or linking electronic apparatuses to the cloud and thus implementing functions such as data storage, data exchange, remote positioning, and interactive control, for example.

FIG. 1 is a diagram of a system for generating and using unique identifiers for electronic apparatuses in accordance with some embodiments. In the example of FIG. 1, system 150 includes a plurality of electronic apparatuses (electronic apparatuses (a) through (h)) linked through network 100.

Each electronic apparatus 102(a), 102(b), 102(c), 102(d), 102(e), 102(f), 102(g), and 102(h) can communicate with network 100 in various ways. Network 100 may be one of various communication technologies that are implemented on the basis of exchanging signals or a combination of more than one communication technology, including, but not limited to, wired technologies using electric and/or optic cables and wireless technologies using infrared, RF, and/or other forms of transmission. For example, network 100 may be the Internet, a wide-area network, or a local-area network, such as a dedicated network for a company. In some embodiments, network 100 is a wireless network.

As shown in FIG. 1, system 150 may include router 104. Different electronic apparatuses 102(a)-(h) may establish network connections via router 104, thus allowing the different electronic apparatuses, electronic apparatuses 102(a)-(h), to establish network intercommunication with each other.

In an alternative example in which system 150 does not include router 104, the different electronic apparatuses 102(a)-(h) may connect in other ways, such as by infrared, Bluetooth, or Zigbee.

In some embodiments, system 150, as shown in FIG. 1, may include server 103, and one or more of electronic apparatuses 102(a)-(h) may communicate with server 103. An electronic apparatus of electronic apparatuses 102(a) through (h) may also serve as a gateway whereby another electronic apparatus of electronic apparatuses 102(a) through (h) may communicate with network 100.

System 150 may be a system set up in a home environment or a commercial environment and may include, for example, but is not limited to: a water supply system, an electric distribution system, a production line control system, a factory control system, an illumination system, a constant temperature control system, an electronic locking system, a monitoring system, an alarm system, and a movement sensor system.

In an Internet of Things system, the various electronic apparatuses may be a combination of user devices (e.g., tablets, phones) used by a user and Internet of Things devices (e.g., appliances). Interactions among the various electronic apparatuses are under the control of the Internet of Things management system.

For example, a user device may be a mobile device such as a mobile communication device (e.g., a smart phone), a tablet computer, a notebook computer, or other electronic aid. Other examples of a user device may be a desktop computer or a set-top box. A user device generally has an interface. For example, the interface is a touchscreen or a keyboard. This interface may be connected to an input/output device having biometric recognition capability and/or information recording capability. Examples of input/output devices include fingerprint scanners for detecting user fingerprint information, image detectors for iris/facial detection, keyboards, buttons, and knobs. For example, an interface in a user device can be connected to a fingerprint scanner that may provide the user's fingerprint information to memory within the user device, such that the user's fingerprint information can be used to authenticate the user's identity in relevant contexts (e.g., when the user is to use the user device to send a command to an electronic apparatus comprising an Internet of Things appliance).

In some embodiments, a user device may have an application (which is sometimes referred to as an "app") installed on it for interacting with Internet of Things devices. The app can be configured to interact with one or more Internet of Things devices (e.g., one or more Internet of Things appliances). For example, the app may be specially configured to interact with a certain household device, the app may be a general-purpose app that is configured to interact with a variety of Internet of Things devices, or the app may be configured to interact with a system-level Internet of Things device.

Internet of Things devices generally are things connected to an Internet of Things system, which includes a network. Examples of Internet of Things devices may include, but are not limited to, industrial robots, smart medical devices, vehicles, door locks, electronic rice cookers, refrigerators, and other industrial or household devices. Internet of Things devices normally have network connection capability so that they can interact with other devices through the Internet of Things network. In some embodiments, Internet of Things devices can be bound to a user device that is described above so that the user of the user device can control Internet of Things devices or view information provided by Internet of Things devices using a user interface of the user device. Interactions between different electronic apparatuses (e.g., between user devices and Internet of Things devices) are achieved in this way.

Some Internet of Things devices and user devices were listed above. Please note that the embodiments of this specification are not limited to Internet of Things devices and user devices.

Security management approaches to electronic apparatuses are explained with examples below in light of application scenarios:

To enable each electronic apparatus to be uniquely identified, a unique identifier needs to be set for each electronic apparatus. In various embodiments, the electronic apparatus can use this identifier to generate sensitive data. For example, generating sensitive data using the identifier includes deriving password information, such as a private key, certificate, and/or encrypted key, in a trusted environment so as to establish a security management system. Moreover, on the basis of this security management system, the electronic apparatus can connect and interact with other electronic apparatuses or networks via a public key/private key pair based on the identifier and thus keep information secure, as will be described further below.

In some embodiments, both user devices and Internet of Things devices can establish corresponding security management systems based on their own identifiers.

For example, each independent user device/Internet of Things device is configured to include a secure element (SE), e.g., a trusted platform module (TPM). In some embodiments, the secure element may be a configuration apparatus that is configured to generate an identifier corresponding to the electronic apparatus associated with the secure element. The identifier of the configuration apparatus is the same as the identifier for the electronic apparatus (e.g., device) in which the secure element is located. In some embodiments, the secure element is implemented as an integrated circuit. In some embodiments, the secure element may be an independently packaged chip or the secure element may also be a module disposed in a secure environment. To keep data secure from external malicious analysis attacks, in some embodiments, the secure element may include a logic circuit that is configured to perform encryption/decryption. In some embodiments, the secure element can derive one or more types of password information based on a generated identifier and thus use the password information to establish a trusted environment and a security management system for the electronic apparatus. In some embodiments, the identifier and all password information in the security management system may be stored in the secure element.

As will be described in further detail below, in various embodiments, a new unique identifier corresponding to an electronic apparatus is to be dynamically generated in response to a user's identifier configuration request. In some embodiments, as will be described below, a user may issue subsequent identifier configuration requests to the same electronic apparatus to cause the secure element of the electronic apparatus to erase or update a previously generated unique identifier with a newly generated identifier.

Figure 2:
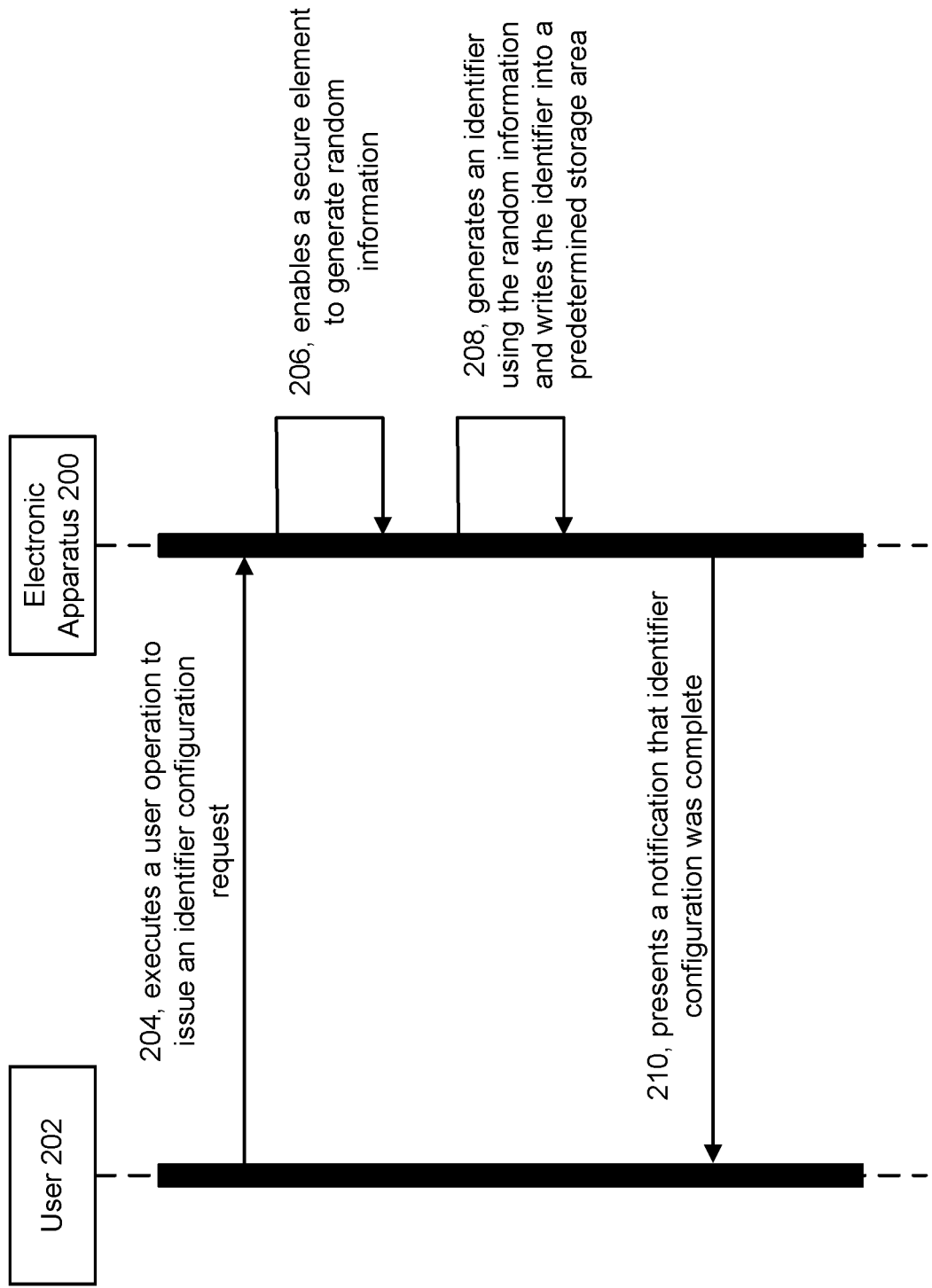
FIG. 2 is a sequence diagram showing an example process of prompting an electronic apparatus to generate a unique identifier to assign to the electronic apparatus in accordance with some embodiments.

FIG. 2 is a sequence diagram showing an example process of prompting an electronic apparatus to generate a unique identifier to assign to the electronic apparatus in accordance with some embodiments. In some embodiments, the process shown in FIG. 2 may be implemented using the example system shown in FIG. 1. In the example sequence diagram of FIG. 2, user 202 interacts with electronic apparatus 200 to cause electronic apparatus 200 to generate a unique identifier for electronic apparatus 200.

At step 204, a user operation is executed by user 202 to issue an identifier configuration request to electronic apparatus 200.

In some embodiments, the user operation is executed by user 202 at electronic apparatus 200 via an interface. Depending on the user operation, this interface may be an interface used for biometric recognition, or it may be a keyboard, a physical button, or a virtual button, for example. To take as an example an interface that is used for biometric recognition, electronic apparatus 200 can perform recognition of user 202's biometric information via an input device that is configured to read biometric information. Then, electronic apparatus 200 can compare the read biometric information with stored biometric information corresponding to a legitimate user. If the read biometric information matches the stored biometric information, then electronic apparatus 200 can permit user 202 to proceed to issue identifier configuration requests to electronic apparatus 200. Otherwise, if the read biometric information does not match the stored biometric information, then electronic apparatus 200 will not permit user 202 to proceed to issue identifier configuration requests to electronic apparatus 200. By first authenticating user 202 before allowing user 202 to issue an identifier configuration request, electronic apparatus 200 avoids control by operations executed by an illegitimate user.

In some embodiments, the interface may use a data processing unit that is configured to accept various different identifier configuration requests (e.g., identifier erasure requests, identifier update requests, or identifier initialization requests) generated by different user operations. For example, a single type of identifier configuration request may be generated by a specific user operation and different types of identifier configuration requests may be generated based on different user operations.

At step 206, in response to the identifier configuration request, electronic apparatus 200 is configured to enable the secure element built into electronic apparatus 200 to generate random information. In various embodiments, the random information may be generated by, for example, a true random number generating module integrated in the secure element. The true random number generating module may comply with the random number standard provided by the National Institute of Standards and Technology (NIST), a FLIP random number standard, or another internationally or nationally endorsed random number standard.

At step 208, the random information is used by the secure element of electronic apparatus 200 to generate an identifier for electronic apparatus 200 and the identifier is written into a predetermined storage area of electronic apparatus 200. In some embodiments, this predetermined storage area may be at least one partition of a non-volatile memory that is built into the secure element or at least one partition in external memory that is managed by the secure element. In some embodiments, a logic circuit that is configured to perform encryption/decryption inside the secure element can read the identifier from this predetermined storage area and then generate a private key/public key pair or other such password information based on this identifier.

In some embodiments, the random information is directly used as the identifier that is written to the predetermined storage area. In some embodiments, the random information is processed and then the processed random information is used as the identifier that is written into the predetermined storage area. One example of processing the random information includes, for example, sampling of the random information to obtain an identifier having a predetermined number of digits. For example, the predetermined number of digits may be determined based on the available storage space of the predetermined storage area.

In some embodiments, when the secure element or an electronic apparatus with a built-in secure element leaves the factory, it may be preset with an initialized identifier that is used to uniquely identify the electronic apparatus. Moreover, this initialized identifier may be stored in the predetermined storage area of the electronic apparatus. In some other embodiments, when an electronic apparatus leaves the factory, the predetermined storage area of the electronic apparatus is in a blank state and does not store an initialized identifier.

In accordance with embodiments described herein, a unique identifier corresponding to an electronic apparatus may be dynamically generated based on a user issued identifier configuration request in a secure manner that also ensures privacy. As a result, the identifiers of electronic apparatuses no longer require management from the electronic apparatus manufacturer after the electronic apparatuses are shipped from the factory. In addition, since it is not possible to predict when the user will configure the identifier of an electronic apparatus or how many times the identifier will be updated (e.g., in response to user operations), the randomness of the identifier will increase further, which reduces the probability that the identifier will be obtained by an illegitimate user.

In some embodiments, there are different types of identification configuration requests that a user can execute corresponding to user operations to issue to the electronic apparatus. The following describes different example types of identifier configuration requests and examples of how they may be handled by the secure element of an electronic apparatus: When the identifier configuration request that is issued by a user via a user operation is an initialization type request, the secure element is triggered to treat random information generated by the true random number generating module directly or after data processing as an initial identifier and to write the initial identifier (which is the random information) into the (e.g., blank) predetermined storage area of the electronic apparatus. When the identifier configuration request that is issued by a user via a user operation is an erasure type request, the secure element is triggered to erase a previously written identifier from the predetermined storage area of the electronic apparatus. When the identifier configuration request is an update/reset type request, the secure element is triggered first to erase the previously written identifier that was stored in the predetermined storage area and then to write the random information cached in the true random number generating module as a new/updated identifier into the predetermined storage area of the electronic apparatus.

In some other embodiments, the interface provides only one type of identifier configuration request. In embodiments in which only one type of identifier configuration request can be issued by a user, in response to receiving an instance of the identifier configuration request, the secure element is configured to erase the previously written identifier, if any, that was stored in the predetermined storage area and then to write the random information cached in the true random number generating module as the new/updated identifier into the predetermined storage area of the electronic apparatus. The advantage of using only one type of identifier is to simplify the process whereby the interface processes identifier configuration requests.

At step 210, a notification that identifier configuration was complete is sent from electronic apparatus 200 to user 202. After electronic apparatus 200 completes the process of initializing, updating, or erasing the identifier that was triggered by the identifier configuration request, electronic apparatus 200 is configured to present a notification to user 202 to inform user 202 that the requested identifier configuration has been completed.

Figure 3:
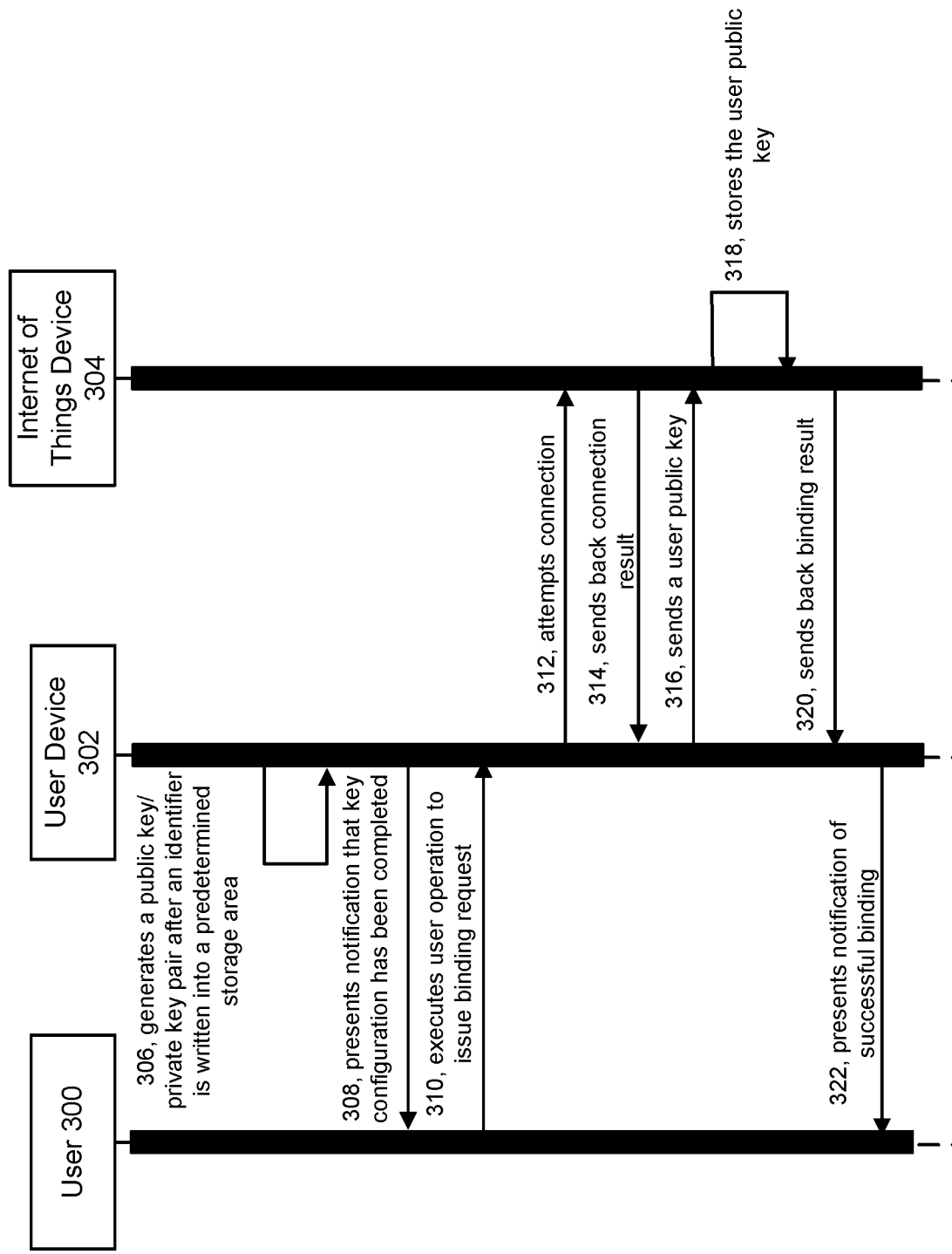
FIG. 3 is a sequence diagram that shows an example process by which a user device binds itself to an Internet of Things device using a public key/private key pair that is generated based on an identifier corresponding to the user device in accordance with some embodiments.

In some embodiments, a user device in an Internet of Things system may generate a public key/private key pair, certificate, or other such password information based on its own identifier and then use this password information to bind itself to certain Internet of Things devices and/or to exchange signals with them operating (e.g., sending commands to) the Internet of Things devices. For example, a private key can be generated for an electronic apparatus by encrypting the electronic apparatus' identifier. FIG. 3 below provides an example process that shows how a user device can bind itself to an Internet of Things device using a generated public key/private key pair. However, it should be noted that using a dynamically generated identifier as described herein is not restricted to just the generation of a public key/private key pair. For example, dynamically generated identifiers as described herein may also serve as a basis for security management systems in other application scenarios. For example, after an identifier is encrypted, the encrypted identifier may be applied to authentication and data exchange processes between different Internet of Things devices or to server identification and management processes directed at different user devices.

FIG. 3 is a sequence diagram that shows an example process by which a user device binds itself to an Internet of Things device using a public key/private key pair that is generated based on an identifier corresponding to the user device in accordance with some embodiments. In some embodiments, the process shown in FIG. 3 may be implemented using the example system shown in FIG. 1. In the example sequence diagram of FIG. 3, user 300 interacts with user device 302 to cause user device 302 to bind itself to Internet of Things device 304.

At step 306, a public key/private key pair is generated by user device 302 after an identifier is written to a predetermined storage area. In some embodiments, the identifier that is written to the predetermined storage area of user device 302 was generated by a secure element of user device 302 in response to a user issued identifier configuration request (e.g., using a process such as the example process that was described in FIG. 2). For example, the identifier that is written to the predetermined storage area of user device 302 was either written to a blank predetermined storage area or was written to replace a previously generated identifier that was stored in the predetermined storage area.

After the identifier is stored in the predetermined storage area of user device 302, a secure element in the user device is configured to generate a new public key/private key pair based on the identifier in a secure environment. In one example, the new public key/private key pair is generated based at least in part on encrypting the identifier.

At step 308, optionally, a notification that key configuration has been completed is presented by user device 302 to user 300. For example, to inform user 300 that the public key/private key pair had been generated, user device 302 may present a notification to user 300 via a corresponding display, indicator light, speaker, or other such component.

At step 310, a binding request is received at user device 302 via an interface from user 300. For example, user 300 may select to bind user device 302 to Internet of Things device 304 by selecting a button on a touchscreen or other input device. For example, user device 302 may discover Internet of Things device 304 by searching within a local area network. In some embodiments, steps 306 and 308 may be executed either before or after step 310.

In some embodiments, user device 302 may authenticate user 300 through biometric recognition or another technique after receiving the binding request in order to ensure that user 300 is a legitimate user for whom the binding request can be performed.

At step 312, an attempt to connect to selected Internet of Things device 304 based on the binding request is made by user device 302. This connection may be implemented by, for example, network 100 or router 104 as shown in FIG. 1 or through another form of connection.

At step 314, a connection result is sent from Internet of Things device 304 to user device 302. After user device 302 is able to form a successful connection with Internet of Things device 304, Internet of Things device 304 may return a connection result to user device 302. While not shown in FIG. 3, in some embodiments, user device 302 may also notify user 300 of the successful connection between user device 302 and Internet of Things device 304.

At step 316, a user public key associated with the user 300 is sent from user device 302 to Internet of Things device 304. As described above, a public key/private key pair was generated by user device 302 based on the unique identifier corresponding to user device 302. The user public key portion of the public key/private key pair was sent from user device 302 to selected Internet of Things device 304 through, for example, the connection established previously in steps 312 and 314.

At step 318, the user public key is stored by Internet of Things device 304. After receiving the user public key associated with user 300, Internet of Things device 304 is configured to store the public key, e.g., in the memory of Internet of Things device 304. Similarly, to further enhance security, Internet of Things device 304 may store the public key in a secure environment built into Internet of Things device 304, e.g., a trusted execution environment or secure element.

At 320, a binding result is sent from Internet of Things device 304 to user device 302. The binding result is data that indicates the successful storage of the public key. Internet of Things device 304 successfully storing the public key that was sent from user device 302 represents the successful binding of Internet of Things device 304 to user device 302.

At 322, optionally, a notification of successful binding is presented by user device 302 for user 300. The notification can be data that is presented at a display, via a speaker, via a light (e.g., as a flash), or via another device.

Following the binding process described above, user 300 may use user device 302 to execute a corresponding operation on bound Internet of Things device 304. The use of the public key/private key enables user device 302 to determine whether the data that it receives from an Internet of Things device is a bound and therefore a legitimate Internet of Things device or from a not bound and therefore not a legitimate Internet of Things device from which authenticate data is sent. For example, user 300 can input a user operation into an Internet of Things application executing at user device 302 to cause user device 302 to issue a corresponding command to Internet of Things device 304. The command, for example, may instruct Internet of Things device 304 to either perform an action, collect data, and/or send data back to user device 302. For example, Internet of Things device 304 includes one or more sensors and in response to a command to report sensor measurements from user device 302, Internet of Things device 304 is configured to encrypt the requested data (e.g., sensor measurements) using the public key that it had previously received from user device 302. Then, Internet of Things device 304 is configured to send the encrypted, requested data back to user device 302. User device 302 is configured to then decrypt the encrypted, requested data using the private key. By binding itself to Internet of Things device 304 via sending Internet of Things device 304 a public key, user device 302 can verify that data it receives from any Internet of Things device is legitimate (i.e., from a bound Internet of Things device) if user device 302 is able to decrypt the encrypted data that it had received from the originating Internet of Things device. If user device 302 is not able to decrypt the encrypted data it had received from an Internet of Things device, then user device 302 is to determine that the originating Internet of Things device is not legitimate (e.g., is not a bound Internet of Things device). Furthermore, due to only user device 302 having the private key that corresponds to the public key that is stored by Internet of Things device 304, in the event that Internet of Things device 304 had sent data that was encrypted using the public key that corresponds to the private key of user device 302 to a user device that was other than user device 302, the other user device would not be able to decrypt the data because it does not have the appropriate private key.

Clearly, the identifier corresponding to each electronic apparatus needs to be private, i.e., cannot be acquired by just anyone who wants it, because sensitive information like password information (e.g., public key/private key pairs) can be derived from the identifier. In addition to being private, the identifier also needs to be difficult to decipher by users so as to prevent illegitimate users from determining the identifier and using it to obtain the sensitive information that is generated from the identifier. The identifier also needs to correspond uniquely to the corresponding electronic apparatus/secure element. Therefore, it is necessary for the secure element to generate, in response to a user operation, a highly random identifier so that different electronic apparatuses have different identifiers and that the identifiers are very unlikely to be acquired through inference or calculation.

Figure 4:
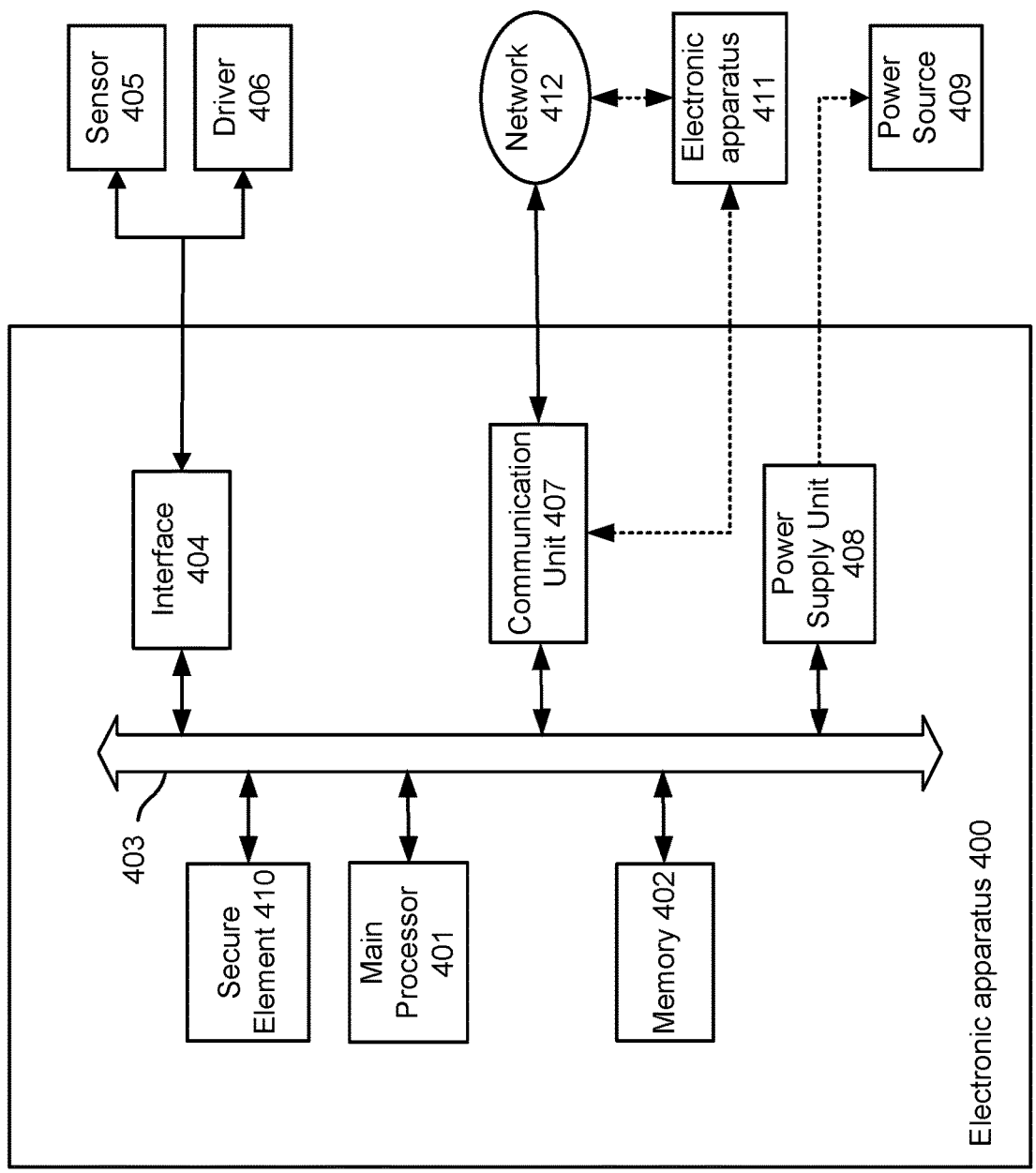
FIG. 4 is a structural diagram showing an example electronic apparatus in accordance with some embodiments.

FIG. 4 is a structural diagram showing an example electronic apparatus in accordance with some embodiments. Each electronic apparatus shown in FIG. 1 may be implemented similarly to example electronic apparatus 400 of FIG. 4. The purpose of the depiction of electronic apparatus 400 in FIG. 4 is to depict at least some components of an electronic apparatus. In the actual implementation of an electronic apparatus, some of the components of electronic apparatus 400 that is shown in FIG. 4 may be omitted, or the connections between the components may be realized in terms of a different architecture. Or in actual practice of an electronic apparatus, the electronic apparatus may include some hardware and/or software modules that are not shown in FIG. 4. In an Internet of Things application scenario, electronic apparatus 400 shown in FIG. 4 may be a user device or an Internet of Things device that is, respectively, configured to respond to a user operation and an identifier configuration request.

The modules, sub-modules, and units described herein can be implemented as software components executing on one or more processors, as hardware such as programmable logic devices, and/or as Application Specific Integrated Circuits designed to elements that can be embodied by a form of software products which can be stored in a non-volatile storage medium (such as optical disk, flash storage device, mobile hard disk, etc.), including a number of instructions for making a computer device (such as personal computers, servers, network equipment, etc.) implement the methods described in the embodiments of the present disclosure. The modules, sub-modules, and units may be implemented on a single device or distributed across multiple devices.

As shown in FIG. 4, electronic apparatus 400 includes main processor 401. Main processor 401 may be a microprocessor, a multi-core processor, a multi-thread processor, an ultra-low-voltage processor, an embedded processor, or other type of processing component. Main processor 401 may be part of a system-on-a-chip (SoC) or, together with other components, it may form a single integrated circuit or a single packaged chip.

Electronic apparatus 400 may also include memory 402 of any quantity and/or capacity. Main processor 401 may communicate with memory 402. Memory 402 may be used to provide storage space for data, applications, operating systems, and other such information. In each implementation, memory 402 may be realized as a storage device for providing non-volatile storage space, or it may include other types of storage devices.

Each type of component in electronic apparatus 400 may communicate through bus 403. Bus 403 may have a unitary bus structure or a bus structure that integrates many different types.

Bus 403 can link main processor 401 to interface 404, which is configured to connect to peripheral devices or for receiving data (such as biometric data). Peripheral devices may include sensor 405, e.g., a temperature sensor, a wind speed sensor, an image sensor, or a pressure sensor. Interface 404 may also be used to connect electronic apparatus 400 to driver 406 for an indicator light, a valve actuator, a speaker, a temperature control device, or other device.

As shown in FIG. 4, electronic apparatus 400 includes communication unit 407. Therefore, electronic apparatus 400 can communicate in various ways with network 412 or other electronic apparatuses such as electronic apparatus 411. Communication unit 407 may, for example, include one or more communication modules. To give an example, communication unit 407 may include a wireless communication module applicable to specific wireless communication protocols. For example, communication unit 407 may include a WLAN module to implement Wi-Fi™ communication in compliance with the 802.11 standard established by the Institute of Electrical and Electronics Engineers (IEEE). Communication unit 407 may also include a WWAN module to implement wireless wide area communication in compliance with cellular or other wireless wide area protocols. Communication unit 407 may also include a communication module, such as a Bluetooth module, that employs another protocol or another communication module of a self-defined type.

As depicted in FIG. 4, electronic apparatus 400 includes power supply unit 408. Power supply unit 408 may be a replaceable battery, a battery rechargeable from an external power source, or a component connected to external power source 409 and used to manage power transmission. External power sources 409 may include, but are not limited to, a solar energy generator, a wind power generator, and a home/industrial power supply cable.

To address security requirements, electronic apparatus 400 further includes at least secure element 410 that is configured to generate and/or store a unique identifier corresponding to electronic apparatus 400. Secure element 410 is configured to provide electronic apparatus 400 with a secure environment. Secure element 410 may be an independently packaged chip, or it may be a component integrated inside main processor 401 and securely isolated from other parts in main processor 401. Secure element 410 may also be an integrated circuit integrated inside a system-on-a-chip and securely isolated from other parts in the system-on-a-chip.

In some embodiments, secure element 410 is configured to not only initialize, erase, store, or update the identifier corresponding to electronic apparatus 400, but secure element 410 is also configured to execute encryption operations based on a secure encryption technique and directed at an initialized identifier, a reset identifier, or other information in need of a high level of privacy. In some embodiments, secure element 410 is also configured to execute appropriate decryption operations on received ciphertext or store feature data (e.g., biometric information input from different users). Thus, encryption/decryption, safeguarding, secure authentication, and other functions can be implemented in the secure environment of secure element 410 to ensure user privacy and data security at electronic apparatus 400.

In some embodiments, secure element 410 may, for example, communicate with main processor 401 via a system management bus (SMB) and thereupon support the management system of electronic apparatus 400 in completing various safeguarding tasks. Secure element 410 may also be integrated with a communication interface and encrypt/decrypt high-speed data streams on the basis of specific data stream encryption/decryption processing mechanisms.

In some embodiments, secure element 410 may also select any partition of memory 402 (e.g., hard drive) and encrypt it, enabling the encrypted, selected partition to store important files that need to be kept confidential.

In some embodiments, secure element 410 is linked to one or more designated interfaces such as interface 404. Interface 404 is linked to secure element 410 and may, in response to a user operation (e.g., that is input via sensor 405), provide corresponding interface information to secure element 410, enabling secure element 410 to obtain an identifier configuration request and to execute a corresponding identifier configuration operation.

Figure 5:
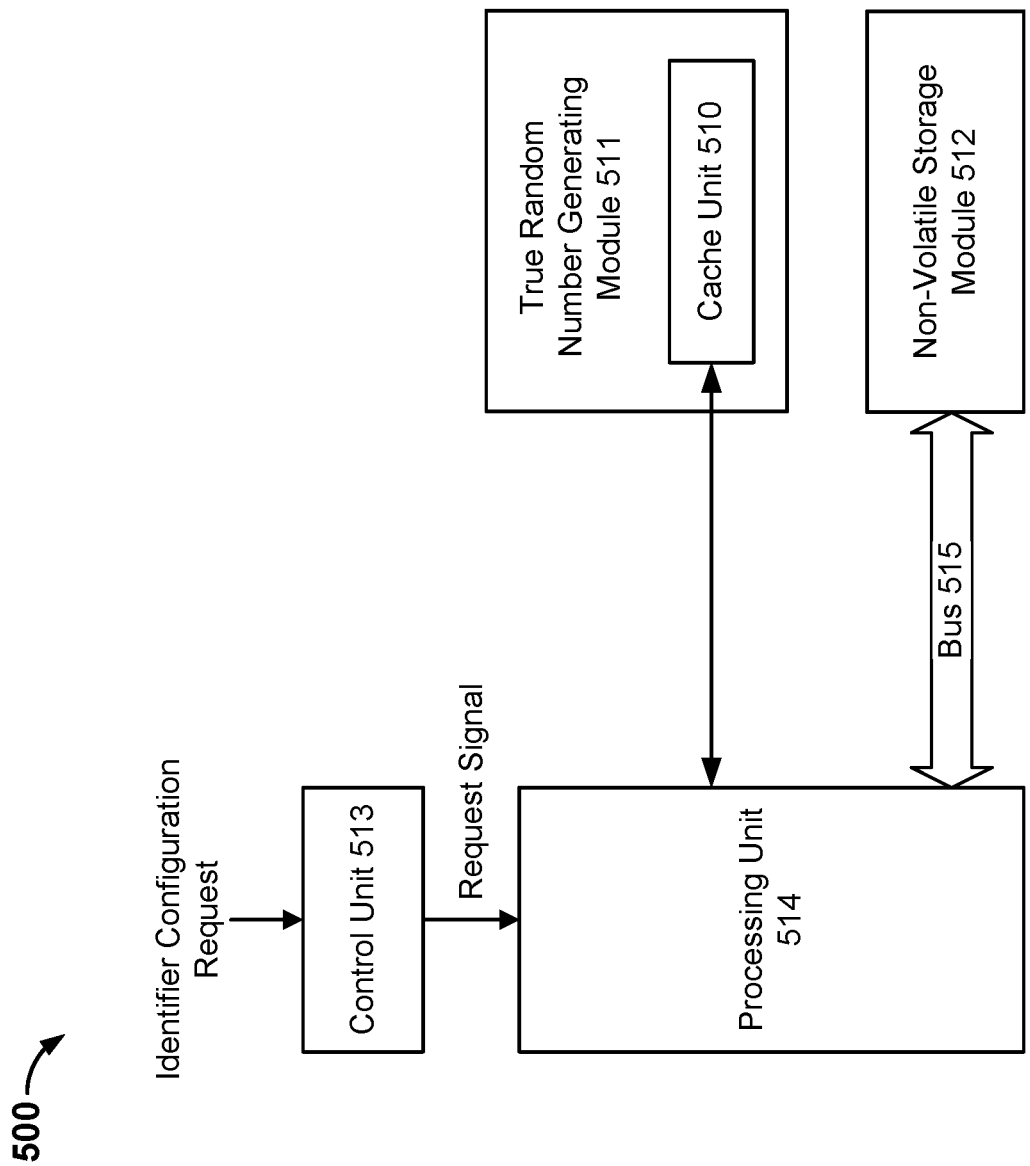
FIG. 5 is a structural diagram of an example secure element in accordance with some embodiments.

FIG. 5 is a structural diagram of an example secure element in accordance with some embodiments.

In the example of FIG. 5, secure element 500 is implemented using hardware, e.g., as an integrated circuit. As such, in the example shown in FIG. 5, secure element 500 does not require software to generate an identifier corresponding to an electronic apparatus. In some embodiments, secure element 410 of FIG. 4 may be generated using the example of secure element 500 of FIG. 5.

As shown in the example of FIG. 5, secure element 500 includes: true random number generating module 511, non-volatile storage module 512, control unit 513, processing unit 514, and bus 515.

Control unit 513 is linked to a corresponding interface that is configured to receive an identifier configuration request from a user. The identifier configuration request is to cause an identifier to be configured for the electronic apparatus with which secure element 500 is associated. In response to receiving an identifier configuration request at the interface, control unit 513 is configured to issue a corresponding request signal based at least in part on interface information provided by the interface.

In some embodiments, control unit 513 may include a register that is configured to store time information, type information, and other configuration information acquired from the interface information. Control unit 513 can then output corresponding request signals based on configuration information stored in the register.

For example, "type information" that is stored in the register may be used to indicate a user indicated type of identifier configuration request. For example, different types of identifier configuration requests include to cancel, reset, initialize, or update the identifier. For example, "time information" that is stored in the register may be used to indicate when the user wishes to execute identifier configuration. Therefore, the request signals provided by control unit 513 can be used to drive processing unit 514 at a specified time to execute an operation to cancel, reset, initialize, or update the identifier.

In some embodiments, control unit 513 is configured to provide a request signal upon being triggered by interface information. This request signal is only used to drive processing unit 514 to sequentially execute preset operations (e.g., reading random information, erasing an existing identifier, and writing an identifier) without having to be controlled by configuration information.

Processing unit 514 is connected to non-volatile storage module 512 via bus 515. After processing unit 514 receives a request signal, processing unit 514 is configured to drive (e.g., send an instruction to) true random number generating module 511 to cause true random number generating module 511 to generate random information and execute (if also instructed to do so by processing unit 514) erasing a previously stored (e.g., the original/initialized) identifier from non-volatile storage module 512 and/or writing the identifier, which is based on the most recently generated random information, into non-volatile storage module 512. In some embodiments, processing unit 514 may also include a data processing unit for performing data processing on random information provided by true random number generating module 511 so as to generate an identifier for secure element 500. The data processing process may, for example, be an encryption process or the process of converting a data structure (e.g., converting the original format of the random information into another format).

Please understand that, although processing unit 514 and non-volatile storage module 512 are depicted separately in FIG. 5, processing unit 514 could, in some embodiments, be a processing unit disposed within non-volatile storage module 512 and be linked to other components within non-volatile storage module 512.

True random number generating module 511 is connected to processing unit 514 and generates random information upon being driven (e.g., instructed) by processing unit 514. In some embodiments, true random number generating module 511 may provide a notification signal to processing unit 514 after generating and caching random information in its local cache unit 510 so that processing unit 514, after receiving the notification signal, can read the random information in cache unit 510 of true random number generating module 511. Then, processing unit 514 is configured to directly use the read random information as the updated/initialized identifier or use the result of data processing the random information as the updated/initialized identifier corresponding to the electronic apparatus with which secure element 500 is associated and write the identifier into non-volatile storage module 512.

In some embodiments, true random number generating module 511, driven by processing unit 514, can sample a true random number generator source such as, for example, a noise source (e.g., randomly varying signals such as thermal noise source, photoelectric effect, physical noise source in atomic/quantum phenomena) provided by an integrated circuit at power-on. The called true random number generator source is produced into random information through a series of one or more hardware circuits of true random number generating module 511 such as an amplifier, a transducer, and/or an analog-to-digital converter, for example. The transducer is configured to convert certain effects of physical phenomena into electrical signals. The amplifier is configured to amplify random disturbance of the electric signals provided from the transducer to a macro-scale. The analog-to-digital converter is configured to output random information by converting the amplified signals into digital signals, which form the random information.

In some embodiments, true random number generating module 511 has a true random number generator source, which can be excited, built into it. Therefore, when the user executes user operations associated with identifier configuration requests, true random number generating module 511 can generate random information in a repeatable manner, enabling the user to perform initializing configurations and resetting configurations of the identifier corresponding to secure element 500. True random number generating module 511 can generate random information based on randomly varying signals provided by hardware (e.g., signal noise generated by a circuit, thermal noise generated by a resistor structure, or jitter signals generated by an oscillator).

True random number generating module 511 includes cache unit 510 that is configured to cache the random information that is generated based on the true random number generator source. The random information may be written by executing hardware inside true random number generating module 511 into cache unit 510. Or, the random information may be written by processing unit 514 into cache unit 510 inside true random number generating module 511 or another cache unit set inside secure element 500. Cache unit 510 may be connected by a data bus to processing unit 514 and that data bus enables processing unit 514 to read random information in cache unit 510 through the data bus. Cache unit 510 may be, for example, first-in-first-out (FIFO) memory. Processing unit 514 may provide cache unit 510 with a read pointer to read random information cached in FIFO memory.

Non-volatile storage module 512 is configured to store the identifier corresponding to the electronic apparatus associated with secure element 500. For example, the identifier could be a root key for establishing a security management system. Non-volatile storage module 512 is a hardware storage means, such as non-volatile random-access memory (NVRAM) or a predetermined storage area in NVRAM.

Figure 6:
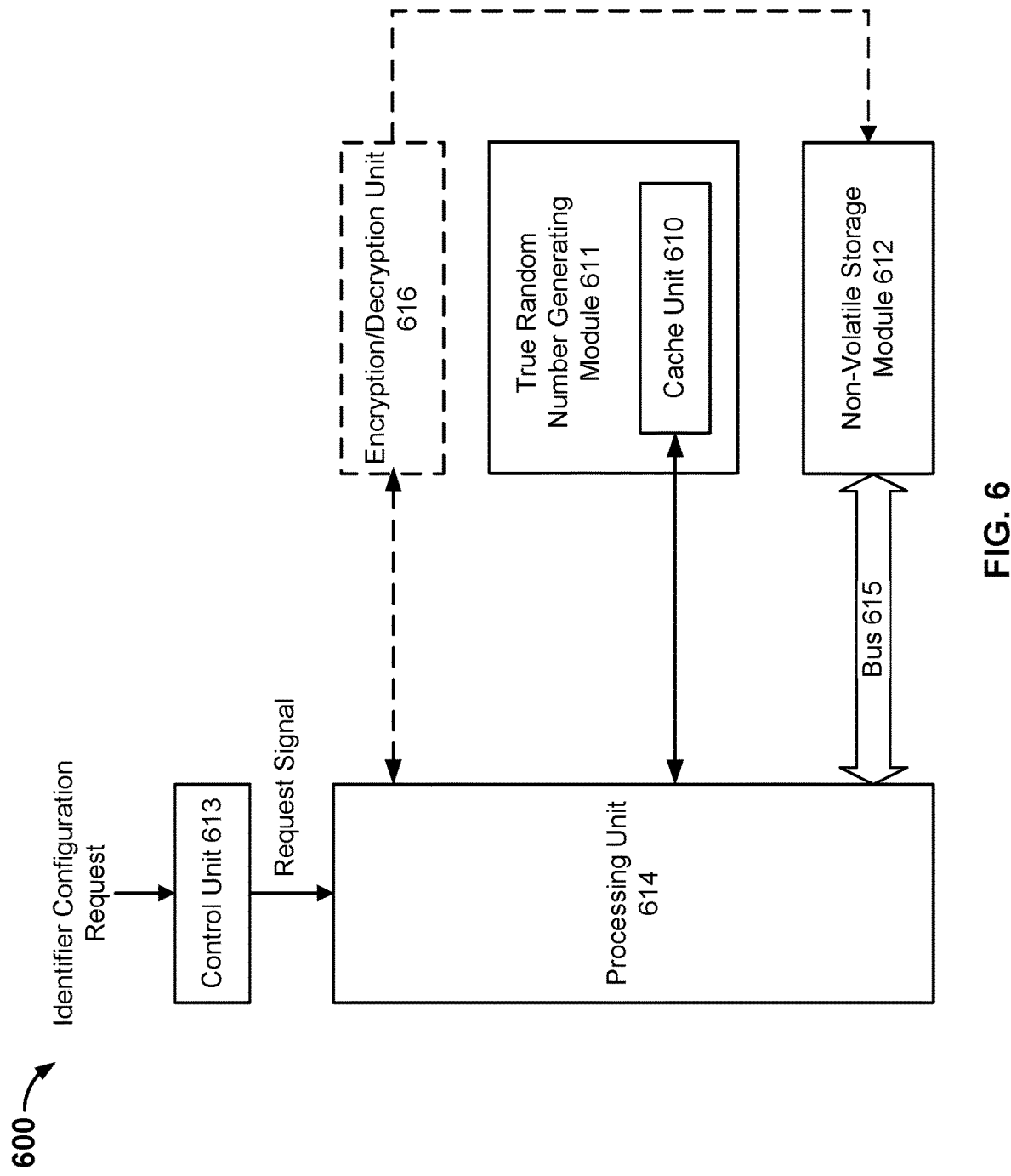
FIG. 6 is a structural diagram of another example secure element in accordance with some embodiments.

FIG. 6 is a structural diagram of another example secure element in accordance with some embodiments.

In the example of FIG. 6, secure element 600 is implemented using hardware, e.g., as an integrated circuit. In some embodiments, secure element 410 of FIG. 4 may be generated using the example of secure element 600 of FIG. 6.

In some embodiments, a secure element such as secure element 600 as shown in FIG. 6 also includes an encryption/decryption unit such as encryption/decryption unit 616. Encryption/decryption unit 616 is configured to provide at least one kind of secure encryption technique with a corresponding decryption technique. Encryption/decryption unit 616 is configured to read the identifier in non-volatile storage module 612 or obtain the identifier from non-volatile storage module 612 via processing unit 614 and encrypt the identifier so as to derive a private key, certificate, or other kind of password information. Encryption/decryption unit 616 may subject ciphertext (e.g., encrypted text) information to a decryption operation based on a decryption technique. Processing unit 614 is connected to non-volatile storage module 612 via bus 615.

At least one secure encryption technique is integrated into encryption/decryption unit 616. The secure encryption technique can support a cryptographic technique designated by a national authority, such as a symmetric cryptographic algorithm, an asymmetrical cryptographic algorithm, or a hashing algorithm. Encryption/decryption unit 616 can also support another international, universal cryptographic technique, such as a hash technique.

Encryption/decryption unit 616 may contain any circuit or other structure to execute one or more encryption/decryption techniques. In some embodiments, the circuit structure contained in encryption/decryption unit 616 may be used to execute an encryption technique relating to an advanced encryption standard (AES) or other standard.

In some embodiments, non-volatile storage module 612 can only be directly accessed by processing unit 614 and not by software run in a main processor or by other hardware or software. Other hardware or software can only obtain wrapped ciphertext (e.g., ciphertext generated by AES wrapping of the identifier) through processing unit 614 and encryption/decryption unit 616. Moreover, access to encryption/decryption unit 616 needs to be restricted to within a secure access environment or to within a securely isolated execution environment.

In some other embodiments, any other appropriate technique may be used to conceal and protect the identifier in non-volatile storage module 612.

Processing unit 614 may include instruction hardware and execution hardware for executing instructions or hardware and modules of other structures.

The instruction hardware may be expressed as any circuit, structure, or other hardware, such as an instruction decoder, used to execute fetch, receive, decode, schedule, and/or other operations directed at instructions. Within the scope of the present invention, instruction hardware is applicable to any instruction format. For example, an instruction scheduled by instruction hardware may contain an opcode and one or more operands, wherein the opcode may be decoded into one or more micro-instructions or micro-operations that can be recognized by the hardware in the execution unit for executing instructions.

Execution hardware may be any circuit structure or other hardware, such as an arithmetic unit, a logic unit, a floating point unit, or a shifter, which is used to implement data processing and execute instructions, micro-instructions, and/or micro-operations.

Processing unit 614 may also include logic hardware, that is configured to execute microcode, state machine logic, and/or programmable logic in order to control: operations between secure element 600 and other components, operations such as data transfers within the secure element 600, and/or data processing of random information read from cache unit 610 in order to obtain the identifier. The logic hardware may cause secure element 600 to execute, or to participate in the execution of, the methods described herein, e.g., the methods described below: making it possible, within secure element 600, for true random number generating module 611, control unit 613, non-volatile storage module 612, encryption/decryption unit 616, and/or resources provided by true random number generating module 611, control unit 613, non-volatile storage module 612, and encryption/decryption unit 616 to be used to execute instructions accepted by instruction hardware and/or micro-instructions or micro-operations corresponding to instructions accepted by instruction hardware.

Please note that secure elements implemented according to embodiments of the present invention are not limited to the modules and units depicted only in FIGS. 5 and 6 and may include any other circuit, structure, or logic module.

For example, in some embodiments, a secure element (such as secure element 500 of FIG. 5 or secure element 600 of FIG. 6) may also include a PUF module, which makes use of the PUF technology described above, and also a mode switching apparatus. The mode switching apparatus may be connected to the PUF module and the processing unit and is configured to implement switching between two secure modes: a "first mode" and a "second mode." In the first mode, the mode switching apparatus starts the PUF module and shuts down the processing unit (that is connected to the true random number generating module) so as to cause the PUF apparatus to provide the identifier. In the second mode, the mode switching apparatus starts the processing unit (that is connected to the true random number generating module) and shuts down the PUF module so as to cause the processing unit to provide the identifier (based on the random information that is generated by a true random number generating module). In such embodiments, the PUF module can provide a physically unclonable identifier when the product departs the factory and can write this as an initial identifier into the predetermined storage area of the electronic apparatus to which the secure element belongs, in the first mode. After the electronic apparatus is shipped from the factory, the mode switching apparatus may exit the first mode and enter the second mode according to a user operation to issue an identifier configuration request. In the second mode, an updated identifier (determined based on random information generated by the true random number generating module) corresponding to the electronic apparatus will be generated and saved in the predetermined storage area. Before the updated identifier that is generated based on the random information is stored at the predetermined storage area, the initial identifier that had been generated by the PUF module is erased from the predetermined storage area. The PUF module and the mode switching apparatus may, for example, be integrated within the same device, or they may be integrated together with such components as the processing unit, the true random number generating module, and the non-volatile storage module on the same system-on-a-chip.

Figure 7:
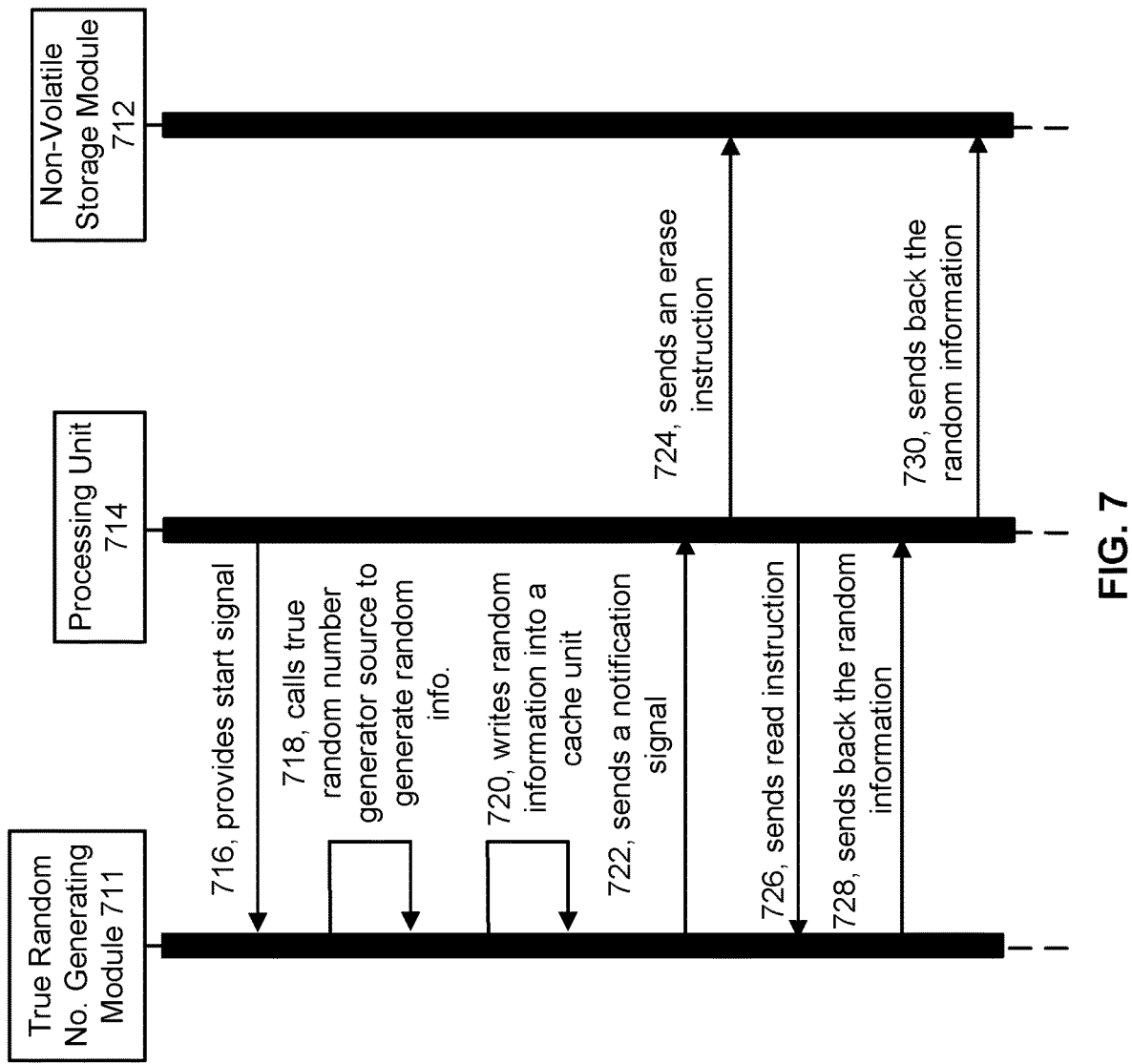
FIG. 7 is a sequence diagram that shows an example process by which a processing unit of a secure element obtains an identifier in accordance with some embodiments.

FIG. 7 is a sequence diagram that shows an example process by which a processing unit of a secure element obtains an identifier in accordance with some embodiments. In some embodiments, the process shown in FIG. 7 may be implemented using the example system shown in FIG. 1. In the example sequence diagram of FIG. 7, processing unit 714 interacts with true random number generating module 711 of a secure element to obtain an identifier corresponding to the electronic apparatus to which the secure element belongs. In some embodiments, processing unit 714 may be implemented using either processing unit 514 of FIG. 5 or processing unit 614 of FIG. 6. In some embodiments, true random number generating module 711 may be implemented using true random number generating module 511 of FIG. 5 or true random number generating module 611 of FIG. 6.

At step 716, a start signal is provided by processing unit 714 to true random number generating module 711. In some embodiments, processing unit 714 sends a start signal to true random number generating module 711 after being triggered by a request signal from a control unit of the secure element. The control unit of the secure element had received an identifier configuration request based on a user operation that is received at an interface.

At step 718, a true random number generator source is called by true random number generating module 711 to generate random information. As described above, the true random generator source may be a noise source (e.g., randomly varying signals) provided by an integrated circuit at power-on. The called true random number generator source provides random information through one or more hardware circuits such as an amplifier, a transducer, or an analog-to-digital converter, for example.

At step 720, the random information is written by true random number generating module 711 into a cache unit. The cache unit may be an output cache area (e.g., implemented by FIFO memory) built into true random number generating module 711, or it may be another cache area in a secure environment.

At step 722, optionally, a notification signal is sent by true random number generating module 711 to processing unit 714.

At step 724, an erase instruction is sent by processing unit 714 to non-volatile storage module 712. After receiving the notification signal from true random number generating module 711, or after a period of waiting time elapses following the issuing of the start signal, processing unit 714 is configured to send an erase instruction to non-volatile storage module 712. Non-volatile storage module 712 is then configured to erase any previously stored identifier (e.g., the initial identifier), if any exists.

At step 726, a read instruction is sent by processing unit 714 to true random number generating module 711. After receiving the notification signal from true random number generating module 711, or after a period of waiting time elapses following the issuing of the start signal, processing unit 714 is configured to send a read instruction to the cache unit, e.g., a read pointer applicable to FIFO memory.

At step 728, the random information is sent from true random number generating module 711 to processing unit 714.

At step 730, the random information is sent from processing unit 714 to non-volatile storage module 712. Processing unit 714 sends the random information with a write instruction to non-volatile storage module 712 (e.g., via a bus) to cause non-volatile storage module 712 to write the random information as a new/updated identifier.

Through the process described above, a secure element may initialize, clear, or update an electronic apparatus' identifier upon being triggered by a user operation.

Figure 8:
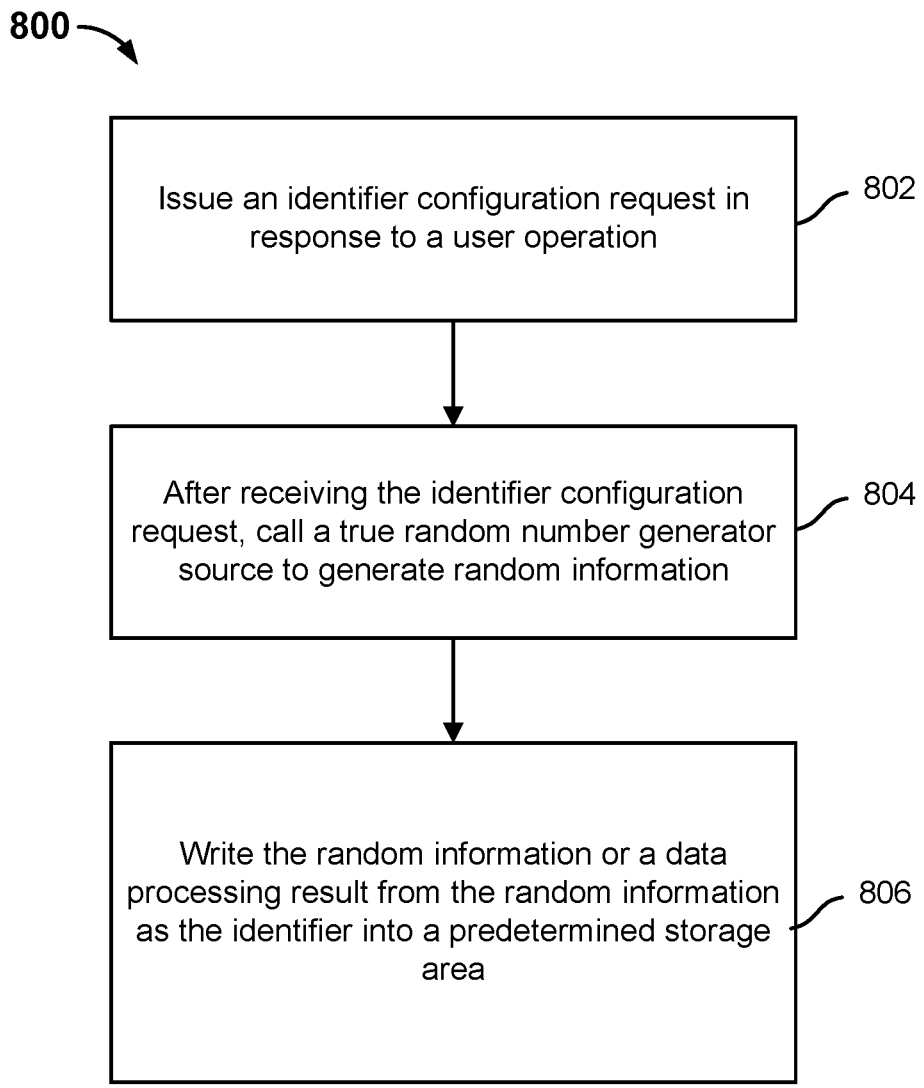
FIG. 8 is a flow diagram showing an embodiment of a process for generating an identifier corresponding to an electronic apparatus comprising a device in accordance with some embodiments.

FIG. 8 is a flow diagram showing an embodiment of a process for generating an identifier corresponding to an electronic apparatus comprising a device in accordance with some embodiments. In some embodiments, process 800 may be implemented at any of electronic apparatuses 102(*a*) through (*h*) of FIG. 1. In some embodiments, process 800 may be implemented by processing unit 514 of secure element 500 of FIG. 5. In some embodiments, process 800 may be implemented by processing unit 614 of secure element 600 of FIG. 6.

At 802, an identifier configuration request is issued in response to a user operation.

In some embodiments, the identifier configuration request is generated by an interface in response to a user operation (e.g., a user selection or a user gesture) at an input device (e.g., touchscreen or keyboard). In some embodiments, the user operation determines a particular type of identifier configuration request. Put in other words, different user operations may result in different types of identifier configuration requests being generated. Examples of types of identifier configuration requests include a request to erase a previously stored identifier, a request to update an identifier (e.g., generate a new identifier to replace a previously stored identifier), and a request to generate an initial identifier (e.g., assuming that there has been no identifier that had been previously generated for the device). In some other embodiments, there is only one type of identifier configuration request, which is configured to request for a previously stored identifier, if any, to be erased and for a new identifier to be generated and stored.

At 804, after the identifier configuration request is received, a true random number generator source is called to generate random information.

A corresponding request signal is generated based on the identifier configuration request. In some embodiments, the request signal is a signal that is configured to enable, drive, or otherwise cause/stimulate a true random number generator to generate random information. In some embodiments, the request signal includes configuration information. As described above, configuration information may include time information (e.g., the time at which the identifier configuration request was received or the time indicated by the user operation to perform the configuration of the identifier). In some embodiments, where there is more than one type of identifier configuration request, the configuration information that is included in the request signal also includes type information that indicates the type (e.g., erase request, update request, initialize request) of the identifier configuration request.

In response to receiving the request signal, the true random number generator is configured to generate random information based on a true random number generator source. In some embodiments, the true random number generator source is a noise source (e.g., thermal noise source, photoelectric effect, physical noise source in atomic/quantum phenomena) provided by an integrated circuit at power-on. The called true random number generator source is produced into random information through a series of one or more hardware circuits of a true random number generating module such as an amplifier, a transducer, and/or an analog-to-digital converter, for example. The transducer is configured to convert certain effects of physical phenomena into electrical signals. The amplifier is configured to amplify random disturbances of the electric signals provided from the transducer to a macro-scale. The analog-to-digital converter is configured to output random information by converting the amplified signals into a set of digital signals, which form the random information.

At 808, the random information or a data processing result from the random information is written as the identifier into a predetermined storage area.

In some embodiments, the random information is stored in a cache unit of the true random number generator module.

In some embodiments, the random information is directly used as the identifier, without any further processing. In some embodiments, the random information is processed and then the processed version is used as the identifier. For example, processing the random information includes encrypting the random information and then the encrypted random information would be used as the identifier.

The identifier is then stored at the predetermined storage area of the device. In some embodiments, if a previously configured identifier is already stored in the predetermined storage area, then the previously configured identifier is erased from the predetermined storage area before the new identifier is written to the predetermined storage area (e.g., so as to maintain only one identifier in the predetermined storage area at a time).

The present application further discloses a computer-readable storage medium on which are stored computer-executable instructions. When executed by a processor, the computer-executable instructions cause the processor to execute the methods of all the embodiments described in the present document.

In addition, the present application further discloses a system, which includes an apparatus for implementing the methods of all the embodiments described in the present document.

According to various embodiments described herein, it is possible to dynamically generate resettable configurations of a unique identifier for hardware (e.g., electronic apparatuses) in response to user operations. The following are some advantages of dynamically generating unique identifiers over conventional techniques: 1) Its technical costs are low: it can be implemented using mature hardware modules. For example, the true random number generating module can be realized using a TRNG, and/or non-volatile random-access memory (NVRAM) can be used to provide the designated partition for storing the identifier. 2) The generated identifier and random information have the qualities of reliability, uniqueness, privacy, and randomness. 3) Since generation of the identifier is triggered by a user operation, the user may decide when the identifier is to be configured, may reset or cancel an identifier that was already generated, and may repeatedly generate new identifiers. Therefore, various embodiments described herein enable flexible identifier configuration while meeting the desired attributes of security and privacy. 4) Since it is not predictable when a user is to configure the identifier or the number of times that the identifier is to be updated, the randomness of the identifier receives a further boost, thus making it extremely unlikely that the current identifier of an electronic apparatus can be deciphered (e.g., by illegitimate users). The following is how matters may be viewed from a security liability perspective given various embodiments described herein: Before products (e.g., electronic apparatuses) with built-in configuration apparatuses are shipped from the factory, the manufacturer of the devices or hardware does not need to introduce an identifier or related key into the products when the devices or chips are to be shipped from the factory. This simplifies the manufacturing process flow. After products with built-in configuration apparatuses are shipped from the factory, identifier configuration will be performed in response to user operations and will no longer need to be managed by the manufacturer. Thus, the responsibility of maintenance associated with the identifier will be transferred from the manufacturer to the users. The manufacturer will not need to be liable for lost or changed keys, leading to lower risks, which in turn will reduce manufacturer liabilities and stresses. Furthermore, users will be spared the trouble of having to communicate with the manufacturer when they manage identifier-related information.

For a person skilled in the art, there are many variations of the embodiments of the present specification. Any modification, equivalent substitution, or improvement made in the spirit and principles of various embodiments described herein shall be included within the protective scope of the various embodiments described herein.

For example, although explanations in the present document make use of the example of the Internet of Things, please be aware that various embodiments described herein may be applied to various contexts in which unique identifiers need to be configured for hardware.

Please understand that all of the embodiments in the present specification are described progressively. Cross-referencing is sufficient for those portions of the embodiments that are the same or similar to each other. The main explanation of each embodiment is of those parts that differ from other embodiments. In particular, with regard to the method embodiments, since they are basically similar to methods described in the apparatus and system embodiments, they are described rather simply. Where necessary, see the explanations in the relevant sections of the other embodiments.

It should be understood that specific embodiments of this specification were described above. Other embodiments fall within the scope of claims. In some situations, the actions or steps recorded in the claims may be executed according to sequences that differ from those in the embodiments, yet the expected result may still be achieved. In addition, the processes depicted in the drawings do not necessarily require the shown specific sequences or continuous sequences in order that the expected results be realized. In some implementations, multi-task processing and parallel processing may also be permissible or may be beneficial.

Please understand that the use of the singular in the present document to describe a component or the display of a single component in a drawing does not mean that the quantity of the component is limited to one. In addition, modules or components that are described or depicted as separate in the present document may be combined into a single module or component. Moreover, a module or component described or depicted as single in the present document may be divided into a plurality of modules or components.

Further understand that the terms and expressions used in the present document are only for descriptive purposes. No number of embodiments of the present specification should be limited to these terms and expressions. The use of these terms and expressions does not imply the exclusion of equivalent features from any representation or description (or part thereof). All possible modifications should be understood as being contained with the scope of the claims. Other modifications, variations, and substitutions may exist. Accordingly, the claims shall be regarded as covering all such equivalents.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A configuration apparatus, comprising:
a processing circuitry configured to:
obtain an identifier configuration request that is in response to a user operation; and
provide a start signal based at least in part on the identifier configuration request;
a true random number generating circuitry configured to generate random information upon being triggered by the start signal provided by the processing circuitry, wherein the true random number generating circuitry, after being triggered by the start signal, is configured to:
generate the random information based on a true random number generator source; and
store the random information in a cache memory; and
a predetermined storage area configured to store an identifier for identifying the configuration apparatus,
wherein the processing circuitry is configured to write the random information or a data processing result from the random information as the identifier into the predetermined storage area.

2. The configuration apparatus of claim 1, wherein the predetermined storage area is securely isolated from an environment external to the configuration apparatus.

3. The configuration apparatus of claim 1, wherein the predetermined storage area is at least one partition within a non-volatile random-access storage memory.

4. The configuration apparatus of claim 1, further comprising an interface that is configured to respond to user operations; and wherein the processing circuitry is configured to obtain the identifier configuration request via the interface.

5. The configuration apparatus of claim 1, wherein the cache memory is FIFO memory.

6. The configuration apparatus of claim 1, wherein the true random number generator source generates the random information based on randomly varying signals provided by hardware.

7. The configuration apparatus of claim 1, wherein the true random number generating circuitry is configured to provide a notification signal to the processing circuitry after generating the random information;
wherein the processing circuitry, in response to the notification signal, is configured to:
read the random information from the true random number generating circuitry; and
write the read random information or the data processing result into the predetermined storage area to reset or initialize the identifier.

8. The configuration apparatus of claim 7, wherein, after receiving the notification signal, and/or before writing the random information or the data processing result into the predetermined storage area, the processing circuitry is further configured to:
provide an erase instruction to the true random number generating circuitry to clear the predetermined storage area.

9. The configuration apparatus of claim 7, wherein the processing circuitry further comprises:
a control circuitry configured to send a request signal in response to the identifier configuration request; and
the processing circuitry is further configured to:
in response to the request signal, read the random information generated by the true random number generating circuitry, and write the identifier into the predetermined storage area based on the random information.

10. The configuration apparatus as described in claim 9, wherein the processing circuitry is further configured to:
perform data processing to the random information to obtain the data processing result; and
write the data processing result as the identifier into the predetermined storage area.

11. The configuration apparatus of claim 10, wherein the data processing comprises sampling the random information to obtain the identifier having a predetermined number of values; and wherein the predetermined number of values corresponds to storage space of the predetermined storage area.

12. The configuration apparatus of claim 1, further comprising a data bus configured to execute at least one of the following operations:
send a read instruction provided by the processing circuitry to the true random number generating circuitry;
send the random information provided by the true random number generating circuitry to the processing circuitry;
send an address and an erase instruction, which are provided by the processing circuitry, to the predetermined storage area; and
send the address, a write instruction, and the random information, which are provided by the processing circuitry, to the predetermined storage area.

13. The configuration apparatus of claim 1, further comprising an encryption circuitry configured to:
read the identifier; and
derive at least one key and/or digital certificate from the identifier.

14. The configuration apparatus of claim 1, wherein the configuration apparatus being comprised in a processor.

15. The configuration apparatus of claim 1, wherein the configuration apparatus being comprised in an electronic apparatus and wherein the electronic apparatus comprises an input/output device.

16. The configuration apparatus of claim 15, wherein the processing circuitry is configured to obtain the identifier configuration request via an interface connected to the input/output device.

17. The configuration apparatus of claim 15, further comprising a main processor and memory; and wherein the main processor and the memory are at least securely isolated from the predetermined storage area.

18. The configuration apparatus of claim 15, further comprising a communication circuitry, wherein the communication circuitry is configured to receive and send data/signals based on a key and/or digital certificate derived from the identifier.

19. The configuration apparatus of claim 15, wherein the configuration apparatus being comprised in a first electronic apparatus, wherein communication between the first electronic apparatus and a second electronic apparatus is based at least on a key and/or digital certificate derived from the identifier.

20. The configuration apparatus of claim 1, wherein the configuration apparatus being comprised in a system-on-a-chip, wherein the system-on-a-chip further comprises:
a physical unclonable function (PUF) circuitry; and
a mode switching apparatus that is connected to the PUF circuitry and the configuration apparatus, wherein the mode switching apparatus is configured to:
in a first type of mode, start the PUF circuitry and shut down the processing circuitry to cause the PUF circuitry to provide the identifier; and
in a second type of mode, start the processing circuitry and shut down the PUF circuitry to cause the processing circuitry to provide the identifier.

21. A method, comprising:
issuing an identifier configuration request in response to a user operation;
after receiving the identifier configuration request, calling a true random number generator source to generate random information;
after generating the random information, caching the random information;
before writing an identifier into a predetermined storage area, reading the cached random information; and
writing the random information or a data processing result from the random information as the identifier into the predetermined storage area.

22. The method of claim 21, further comprising:
after generating the random information, or
after issuing the identifier configuration request and before generating the random information,
erasing the predetermined storage area.

23. A configuration apparatus, comprising:
a processing circuitry configured to:
obtain an identifier configuration request that is in response to a user operation; and
provide a start signal based at least in part on the identifier configuration request;
a true random number generating circuitry configured to generate random information upon being triggered by the start signal provided by the processing circuitry; and
a predetermined storage area configured to store an identifier for identifying the configuration apparatus,
wherein the processing circuitry is configured to:
perform data processing to the random information to obtain a data processing result, wherein the data processing comprises sampling the random information to obtain the identifier having a predetermined number of values, and wherein the predetermined number of values corresponds to storage space of the predetermined storage area; and
write the data processing result as the identifier into the predetermined storage area.

24. A configuration apparatus, comprising:
a processing circuitry configured to:
obtain an identifier configuration request that is in response to a user operation; and
provide a start signal based at least in part on the identifier configuration request;
a true random number generating circuitry configured to generate random information upon being triggered by the start signal provided by the processing circuitry; and
a predetermined storage area configured to store an identifier for identifying the configuration apparatus,
wherein the processing circuitry is configured to write the random information or a data processing result from the random information as the identifier into the predetermined storage area; and
a data bus configured to execute at least one of the following operations:
send a read instruction provided by the processing circuitry to the true random number generating circuitry;
send the random information provided by the true random number generating circuitry to the processing circuitry;
send an address and an erase instruction, which are provided by the processing circuitry, to the predetermined storage area; and
send the address, a write instruction, and the random information, which are provided by the processing circuitry, to the predetermined storage area.

25. A configuration apparatus, comprising:
a processing circuitry configured to:
obtain an identifier configuration request that is in response to a user operation; and
provide a start signal based at least in part on the identifier configuration request;
a true random number generating circuitry configured to generate random information upon being triggered by the start signal provided by the processing circuitry; and
a predetermined storage area configured to store an identifier for identifying the configuration apparatus,
wherein the processing circuitry is configured to write the random information or a data processing result from the random information as the identifier into the predetermined storage area; and
wherein the configuration apparatus being comprised in a first electronic apparatus and wherein the first electronic apparatus comprises an input/output device, wherein communication between the first electronic apparatus and a second electronic apparatus is based at least on a key and/or digital certificate derived from the identifier.

26. A configuration apparatus, comprising:
a processing circuitry configured to:
obtain an identifier configuration request that is in response to a user operation; and
provide a start signal based at least in part on the identifier configuration request;
a true random number generating circuitry configured to generate random information upon being triggered by the start signal provided by the processing circuitry; and
a predetermined storage area configured to store an identifier for identifying the configuration apparatus,
wherein the processing circuitry is configured to write the random information or a data processing result from the random information as the identifier into the predetermined storage area; and
wherein the configuration apparatus being comprised in a system-on-a-chip, wherein the system-on-a-chip further comprises:
a physical unclonable function (PUF) circuitry; and
a mode switching apparatus that is connected to the PUF circuitry and the configuration apparatus, wherein the mode switching apparatus is configured to:
in a first type of mode, start the PUF circuitry and shut down the processing circuitry to cause the PUF circuitry to provide the identifier; and in a second type of mode, start the processing circuitry and shut down the PUF circuitry to cause the processing circuitry to provide the identifier.

* * * * *